United States Patent
Zhang et al.

(10) Patent No.: US 9,485,505 B2
(45) Date of Patent: Nov. 1, 2016

(54) METHOD AND APPARATUS OF REFERENCE PICTURE MANAGEMENT FOR VIDEO CODING

(71) Applicant: MediaTek Singapore Pte. Ltd., Singapore (SG)

(72) Inventors: Kai Zhang, Beijing (CN); Jicheng An, Beijing (CN); Qin Yu, Beijing (CN); Siwei Ma, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 298 days.

(21) Appl. No.: 14/103,852

(22) Filed: Dec. 12, 2013

(65) Prior Publication Data

US 2014/0169459 A1    Jun. 19, 2014

Related U.S. Application Data

(63) Continuation-in-part of application No. PCT/CN2012/086554, filed on Dec. 13, 2012.

(51) Int. Cl.
*H04N 7/12* (2006.01)
*H04N 19/503* (2014.01)
*H04N 19/70* (2014.01)

(52) U.S. Cl.
CPC ...... *H04N 19/00575* (2013.01); *H04N 19/503* (2014.11); *H04N 19/70* (2014.11)

(58) Field of Classification Search
IPC .......................................... H04N 19/105,19/573
See application file for complete search history.

(56) References Cited

U.S. PATENT DOCUMENTS

2006/0083298 A1*  4/2006  Wang ............... H04N 19/196
                                                  375/240.01
2012/0230409 A1*  9/2012  Chen ............... H04N 19/105
                                                  375/240.15

* cited by examiner

*Primary Examiner* — Tracy Li
(74) *Attorney, Agent, or Firm* — McClure, Qualey & Rodack, LLP

(57) ABSTRACT

A method and apparatus that determine one or more reference pictures for the current image unit and indicate the reference pictures using information associated with COIs (coding order indexes) of the reference pictures are disclosed. The image unit corresponds to a picture, a slice of the picture, or a region of the picture. Inter-picture encoding or decoding is applied to the input data using the reference pictures. The information associated with the COIs can be incorporated in a slice header or a picture header of a bitstream associated with the video sequence. Furthermore, the COI can be represented by a coded COI using a fixed number of bits, wherein the coded COI is constrained to a range from 0 to MAC_COI-1 and MAX_COI is a positive integer.

17 Claims, 6 Drawing Sheets

| short_term_ref_pic_set( idxRps ) { | Descriptor |
|---|---|
| if( idxRps != 0 ) | |
|    inter_ref_pic_set_prediction_flag | u(1) |
| if( inter_ref_pic_set_prediction_flag ) { | |
|    if( idxRps == num_short_term_ref_pic_sets ) | |
|      delta_idx_minus1 | uc(v) |
|    delta_rps_sign | u(1) |
|    abs_delta_rps_minus1 | uc(v) |
|    for( j = 0; j <= NumDeltaPocs[ RIdx ]; j++ ) { | |
|      used_by_curr_pic_flag[ j ] | u(1) |
|      if( !used_by_curr_pic_flag[ j ] ) | |
|        use_delta_flag[ j ] | u(1) |
|    } | |
| } | |
| else { | |
|    num_negative_pics | ue(v) |
|    num_positive_pics | ue(v) |
|    for( i = 0; i < num_negative_pics; i++ ) { | |
|      delta_poc_s0_minus1[ i ] | ue(v) |
|      used_by_curr_pic_s0_flag[ i ] | u(1) |
|    } | |
|    for( i = 0; i < num_positive_pics; i++ ) { | |
|      delta_poc_s1_minus1[ i ] | ue(v) |
|      used_by_curr_pic_s1_flag[ i ] | u(1) |
|    } | |
| } | |
| } | |

*Fig. 1*

| | |
|---|---|
| ... | |
| for( i = 0; i < num_short_term_ref_pic_sets; i++) | |
|   short_term_ref_pic_set( i ) | |
| ... | |

| | |
|---|---|
| ... | |
| short_term_ref_pic_set_sps_flag | u(1) |
| if( !short_term_ref_pic_set_sps_flag ) | |
|   short_term_ref_pic_set( num_short_term_ref_pic_sets ) | |
| else | |
|   short_term_ref_pic_set_idx | u(v) |
| ... | |

| ref_pic_lists_modification( ) { | Descriptor |
|---|---|
| ref_pic_list_modification_flag_l0 | u(1) |
| if( ref_pic_list_modification_flag_l0 ) | |
|    for( i = 0; i <= num_ref_idx_l0_active_minus1; i++ ) | |
|      list_entry_l0[ i ] | u(v) |
| if( slice_type  ==  B ) { | |
|    ref_pic_list_modification_flag_l1 | u(1) |
|    if( ref_pic_list_modification_flag_l1 ) | |
|      for( i = 0; i <= num_ref_idx_l1_active_minus1; i++ ) | |
|         list_entry_l1[ i ] | u(v) |
|    } | |
| } | |

*Fig. 5*

| ... | |
|---|---|
| coi | u(8) |
| use_rcs_flag | u(1) |
| if(use_rcs_flag) | |
| { | |
|    rcs_index | u(4) |
| } | |
| Else | |
| { | |
|    reference_configuration_set(num_of_rcs) | |
| } | |
| ... | |

*Fig. 6*

Play order:   0   1   2   3   4   5   6   7   8

COI( POI) 
{
0(0)             1(4)                5(8)
    3(1)       4(3)      7(5)      8(7)
        2(2)                 6(6)
}

*Fig. 7*

| num_ref_l0 | u(v) |
|---|---|
| for(i=0;i<num_ref_l0;i++) | |
|     list0_ref_coi_delta[i] | u(v) |
| If(Is_B_Slice){ | |
| num_ref_l1 | u(v) |
| for(i=0;i<num_ref_l1;i++) | |
|     list1_ref_coi_delta[i] | u(v) |
| } | |

*Fig. 8*

| num_removed_ref | u(v) |
|---|---|
| for(i=0;i<num_removed_ref;i++) | |
|     removed_coi_delta[i] | u(v) |

*Fig. 9*

| | |
|---|---|
| reference_configuration_set(i){ | |
| delta_poi[i] | u(6) |
| refered_by_others_flag[i] | u(1) |
| num_of_reference[i] | u(3) |
| for(j=0;j<num_of_reference;j++) | |
| { | |
| delta_coi_of_ref[i][j] | u(6) |
| } | |
| num_of_useless[i] | u(3) |
| for(j=0;j<num_of_useless[i];j++) | |
| { | |
| delta_coi_of_useless[i][j] | u(6) |
| } | |

*Fig. 10*

| | |
|---|---|
| ... | |
| num_of_rcs | u(6) |
| for( i=0; i<num_of_rcs; i++) | |
| { | |
| reference_configuration_set(i) | |
| } | |
| ... | |

*Fig. 11*

METHOD AND APPARATUS OF REFERENCE PICTURE MANAGEMENT FOR VIDEO CODING

CROSS REFERENCE TO RELATED APPLICATIONS

The present invention is a continuation-in-part of PCT Patent Application, Serial No. PCT/CN2012/086554, filed on Dec. 13, 2012, entitled "A New Reference Management Method for Video Coding". The PCT Patent Application is hereby incorporated by reference in its entirety.

FIELD OF THE INVENTION

The present invention relates to video coding. In particular, the present invention relates to reference picture management for video coding.

BACKGROUND AND RELATED ARTS

Motion estimation is an effective inter-frame coding technique to exploit temporal redundancy in video sequences. Motion-compensated inter-frame coding has been widely used in various international video coding standards. For video coding systems incorporating inter-frame or inter-picture coding, the processing of a current picture can utilize information from previously coded pictures (or slices or regions). These previously coded pictures are decoded before they are used for prediction and the decoded pictures are called 'reference pictures'. In newer video coding standards, such as Advanced Vide Coding (AVC, also known as H.264) and emerging High Efficiency Video Coding (HEVC), inter-picture redundancy has been well exploited by using very elaborate reference pictures. The reference pictures have to be stored in reference picture buffer in the encoder side as well as the decoder side. Since the number of reference pictures used may be quite large, it becomes a critical issue for a coding system to manage reference pictures efficiently.

In the HEVC standard (Bross et al, "High Efficiency Video Coding (HEVC) text Specification Draft 9", Joint Collaborative Team on Video Coding (JCT-VC) of ITU-T SG16 WP3 and ISO/IEC JTC1/SC29/WG11, JCTVC-K1003_v10, October 2012.), flexible reference picture management is disclosed. The encoder can choose the reference parameters for coding each picture. The reference parameters may include the number of reference pictures used to construct the reference lists, the order of the reference pictures in the reference lists and reference picture usage. The reference picture information is transmitted in the video bitstream so that the decoder can recover the corresponding reference pictures at the decoder side. To implement these functions, reference picture management design according to HEVC is described as follows.

A POC (Picture Order Count) is assigned to each picture and conveyed in the slice header from the encoder to the decoder. POC represents the output order (i.e., display order) of a picture. For a slice, a Reference Picture Set (RPS) is used to define the reference pictures used for the current slice. In RPS, reference pictures are located by the difference between POC of the current picture and the reference picture. The syntax of short-term RPS based on POC according to HEVC is shown in FIG. 1. Since the output order may be different from the coding order, POCs of the reference pictures may be smaller or larger than the POC of the current picture. There are two ways, i.e., direct and predictive modes, to code the POCs according to HEVC as indicated by inter_ref_pic_set_prediction_flag. If the flag is equal to 0, the reference picture set of the current picture is represented using the direct mode. If the flag is equal to 1, the reference picture set of the current picture is represented using the predictive mode. In the direct mode, POCs of reference pictures are coded as set s0 corresponding to POCs lower than the current picture and set s1 corresponding to POCs larger than the current picture respectively. These reference pictures may be used by the current picture if used_by_curr_pic_sx_flag is equal to 1, or used by following pictures but not used by the current picture if used_by_curr_pic_sx_flag is equal to 0. In the predictive mode, POCs of reference pictures are predicted by a previously coded RPS indicated by delta_idx_minus1.

RPS can be incorporated in SPS (Sequecne Parameter Set) as dipicted in FIG. 2. Multiple reference picture sets can be transmitted in SPS, as indicated by num_short_term_ref_pic_sets. A slice may select a RPS transmitted in SPS as indicated by short_term_ref_pic_set_idx or the slice may use a new RPS transmitted in the slice header. The corresponding syntax structure in the slice header is shown in FIG. 3.

For a decoded picture in DPB (Decoded Picture Buffer), if the picture is not included in the RPS of the current picture, the picture is not a reference picture any more and can be removed from the DPB after output.

Reference lists can be constructed after reference pictures used by the current picture are specified. A default list construction rule for HEVC is defined as shown in FIG. 4. For List 0, reference pictures with POCs lower than the current picture in the decending POC order are placed in DPB from the top of the DPB buffer list. Reference pictures with POCs higher than the current picture are then placed in the DPB according to the accending POC order. Accordingly, List 0 for the example of FIG. 4 is 2, 1, 4 and 5. For List 1, reference pictures with POCs higher than the current picture are placed in the DPB from the top of the DPB buffer list according to the accending POC order. Reference pictures with POCs lower than the current picture are then placed in the DPB according to the dcending POC order. Accordingly, List 1 for the example of FIG. 4 is 4, 5, 2 and 1. The encoder can also assign the reference lists in an explicit way by sending a ref_pic_lists_modification( ) syntax table in the slice header as shown in FIG. 5.

BRIEF SUMMARY OF THE INVENTION

A method and apparatus of reference picture management for video coding of a video sequence are disclosed. Embodiments according to the present invention determine one or more reference pictures for the current image unit, wherein said one or more reference pictures are indicated using information associated with COIs (coding order indexes) of said one or more reference pictures. The image unit may correspond to a picture, a slice of the picture or a region of the picture. Inter-picture encoding or decoding is then applied to the input data using the reference pictures. The information associated with the COIs can be incorporated in a slice header or a picture header of a bitstream associated with the video sequence. Furthermore, the COI can be represented by a coded COI using a fixed number of bits, wherein the coded COI is constrained to a range from 0 to MAC_COI-1 and MAX_COI is a positive integer. At the decoder side, the COI is determined from the coded COI and COI_MSB, wherein the COI_MSB corresponds to the most significant bits portion of the COI exceeding the coded COI.

At the decoder side, the COI_MSB is initialized to 0 when a first picture or a refreshing picture in the video sequence is received. Furthermore, the COI_MSB is incremented by N when a current coded COI received at the decoder side is lower than the coded COI of a last decoded picture. N is a positive integer, such as 256.

One aspect of the invention addresses reference picture parameters. A RCS (Reference Configuration Set) can be used to define reference picture parameters associated with the reference pictures. The reference picture parameters comprise a delta POI (playing order index) corresponding to the difference between the COI and POI of the current picture. The POI can be recovered at a decoder side based on the COI and the delta POI. The reference picture parameters may further comprise the number of reference pictures, the number of useless pictures, indication regarding whether the current picture is referred by following pictures, indication of decoded pictures that are referred by the following pictures, indication of the decoded pictures that belong to the useless pictures, or any combination thereof. A reference picture list of the reference pictures for the current picture can be reconstructed at a decoder side according to the reference picture parameters in the RCS. The reference pictures can be identified by the differences between the COI of the current picture and the COIs of the reference pictures. Similarly, the useless pictures can be identified by the differences between the COI of the current picture and the COIs of the useless pictures. The useless pictures can be removed from DPB (decoded picture buffer) at a decoder side after the useless pictures are outputted. The current picture can also be removed from DPB (decoded picture buffer) at a decoder side after the current picture is outputted if the current picture is not used by following pictures. The RCS can be incorporated in a sequence header, a slice header or a picture header in a bitstream associated with the video sequence. Multiple RCSs can be used and a selection indicator can be incorporated in a slice header or a picture header to select one RCS from the multiple RCSs for the current picture.

BRIEF DESCRIPTION OF THE DRAWINGS

FIG. 1 illustrates the short-term reference picture set syntax as specified in the High Efficiency Video Coding (HEVC) standard.

FIG. 5 illustrates the reference picture list modification syntax according to the High Efficiency Video Coding (HEVC) standard.

FIG. 6 illustrates an example of coi (coding order index) syntax in the picture or slice header according to an embodiment of the present invention.

FIG. 7 illustrates an example of COI (Coding Order Index) and POI (Playing Order Index) for a video sequence according to an embodiment of the present invention.

FIG. 8 illustrates an example of syntax design for signaling the reference picture lists according to an embodiment of the present invention.

FIG. 9 illustrates an example of syntax design for signaling the reference picture list that can be removed from the DPB (Decoded Picture Buffer) according to an embodiment of the present invention.

FIG. 10 illustrates an example of syntax design for signaling the RCS (Reference Configuration Set) according to an embodiment of the present invention.

FIG. 11 illustrates an example of syntax design for signaling the RCS (Reference Configuration Set) in the sequence header according to an embodiment of the present invention.

DETAILED DESCRIPTION OF THE INVENTION

Figures 2, 3, 4:
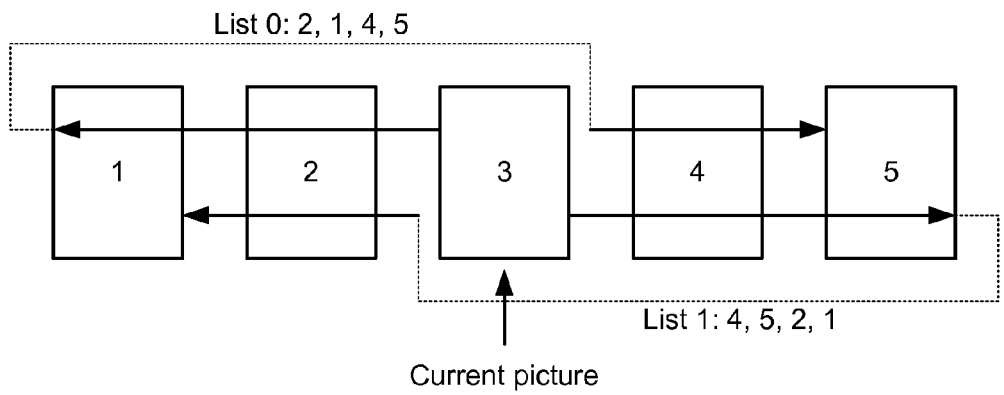
FIG. 2 illustrates the Reference Picture Set (RPS) syntax table incorporated in sequence parameter set (SPS) as specified in the High Efficiency Video Coding (HEVC) standard.
FIG. 3 illustrates the Reference Picture Set (RPS) syntax table incorporated in a slice header as specified in the High Efficiency Video Coding (HEVC) standard.
FIG. 4 illustrates an example of the default reference picture list construction according to the High Efficiency Video Coding (HEVC) standard.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

According to the present invention, an image unit is encoded or decoded, where the image unit may correspond to a picture, a slice of the picture or a region of the picture. A region corresponds to a group of pixels of the picture. For reference picture management, Coding Order Index (COI) and Playing Order Index (POI) are defined according to the present invention. Coding Order Index (COI) represents the coding order associated with a picture. COI can be transmitted in a slice header or a picture header. Exemplary COI derivation at the encoder side and the decoder side is described as follows.

For the encoder side:
1. Initialization. For the first picture to be coded or a special picture in a sequence, referred as 'Refreshing Picture (RP)', the corresponding COI is set to 0;

2. Accumulation. The COI of the current picture to be coded is derived according to COI_cur=COI_last+1, where COI_last is the COI of the last coded picture; and
3. Transmission. A syntax element coi is coded in the slice or picture header as shown in FIG. 6. coi is constrained to the range of [0, MAX_COI-1], and coi can be calculated as COI % MAX_COI. For example, MAX_COI can be 256.

For the decoder side:
1. Initialization. For the first picture to be coded or a special picture in a sequence, referred as 'Refreshing Pictures (RP)', the corresponding COI is set to 0. Set COI_MSB=0, where COI_MSB corresponds to the most significant bits (MSB) part of the COI that is beyond the base part of COI represented by coi;
2. Parsing. coi is parsed from the slice or picture header of the bitstream; and
3. Accumulation. If coi of the current picture is lower than that of the last picture, COI_MSB=COI_MSB+MAX_COI. For example, MAX_COI can be 256.
4. Restoring. COI=coi+COI_MSB.

The Playing Order Index (POI) represents the playing order (i.e., display order) of a picture, which is similar to the POC used in HEVC. COI and POI may be different since the coding order may be different from the playing order. An embodiment according to the present invention transmits COI and the difference (referred to as delta) between COI and POI. POI can be calculated from COI and the difference (i.e., delta) between COI and POI transmitted in RCS (Reference Configuration Set).

FIG. 7 illustrates an example of COI and POI derivation according to an embodiment of the present invention. The COI values and associated delta values correspond to (0,0), (1, −3), (2, 0), (3, 2), (4, 1), (5, −3), (6,0), (7, 2), (8, 1) for the example in FIG. 7. The delta values are represented by delta_poi[i] as disclosed below.

In one embodiment, the reference lists can be signaled using COI directly. Since the COIs of reference pictures for a current picture are always smaller than the COI of the current picture, the delta COIs of the reference pictures contain no negative value and can be coded in the slice header. An exemplary syntax design for signaling the reference picture lists are shown in FIG. 8, where num_ref_l0 indicates the number of reference pictures in list0 and num_ref_l1 indicates the number of reference pictures in list1.

According to an embodiment of the present invention, a sliding window scheme is used to manage the DPB. The DPB will use N pictures at most. Newer reference pictures will overwrite the older reference picture when the total number of reference pictures exceeds N. In the slice header, information can be signaled explicitly to indicate the pictures that can be removed from the DPB. An example of syntax design to indicate the reference pictures that can be removed from the DPB is shown in FIG. 9. Furthermore, the reference pictures in the DPB can be classified into classes. The details of the classes are coded in the SPS. In the slice header, only a class index is needed.

In order to sufficiently represent the RCS, RCS[i] includes six major parts as depicted in FIG. 10, where i is the index to indicate a specific RCS 1. Delta_poi[i] indicates the difference between COI and POI for the current picture. POI=COI+delta_poi[i], where delta_poi[i] is a signed integer;
2. refered_by_others_flag[i] indicates whether the current picture can be used as a reference picture. If refered_by_others_flag[i] equals to 0, the current picture will not be used as a reference picture for the following pictures. Otherwise, the current picture may be used as a reference picture for the following pictures;
3. num_of_reference[i] indicates the number of reference pictures for the current picture, where num_of_reference[i] is an unsigned integer;
4. delta_coi_of_ref[i][j] indicates the delta COI between the current picture and a reference picture R[j] at position j in the reference list. The COI of R[j], i.e., COI_R[j] is calculated as COI_R[j]=COI-delta_coi_of_ref[i][j], where delta_coi_of_ref[i][j] is an unsigned integer. In another example, COI_R[j] is calculated as COI_R[j]=COI-delta_coi_of_ref[i][j]−1;
5. num_of_useless[i] indicates the number of decoded pictures that are not used (i.e., useless decoded pictures), where num_of_useless[i] is an unsigned integer; and
6. delta_coi_of_useless[i][j] indicates the delta COI between the current picture and a useless decoded picture U[j]. The COI of U[j], i.e., COI_U[j] is calculated as COI_U[j]=COI-delta_coi_of_useless[i][j], where delta_coi_of_useless[i][j] is an unsigned integer. In another example, COI_U[j] is calculated as COI_U[j]=COI-delta_coi_of_useless[i][j]−1.

RCS can be incorporated in the slice or picture header as shown in FIG. 6, or it can be incorporated in the sequence header as depicted in FIG. 11. If RCS is not incorporated in the slice or picture header, i.e. use_rcs_flag=1, a RCS index (rcs_index) should be transmitted to indicate which RCS is used for this picture as depicted in FIG. 6.

Based on its RCS, the reference picture list can be constructed directly for a picture as follows. The decoded picture with COI equal to COI_R[j] is set as the j-th picture in the reference picture list.

Useless pictures will not be used as reference pictures after the current picture. Therefore, the decoder can remove useless pictures from the DPB after outputting the useless pictures.

If the current picture is not used as a reference picture for the following pictures, the decoder can remove the current picture from the DPB after outputting the current picture.

Figure 12:
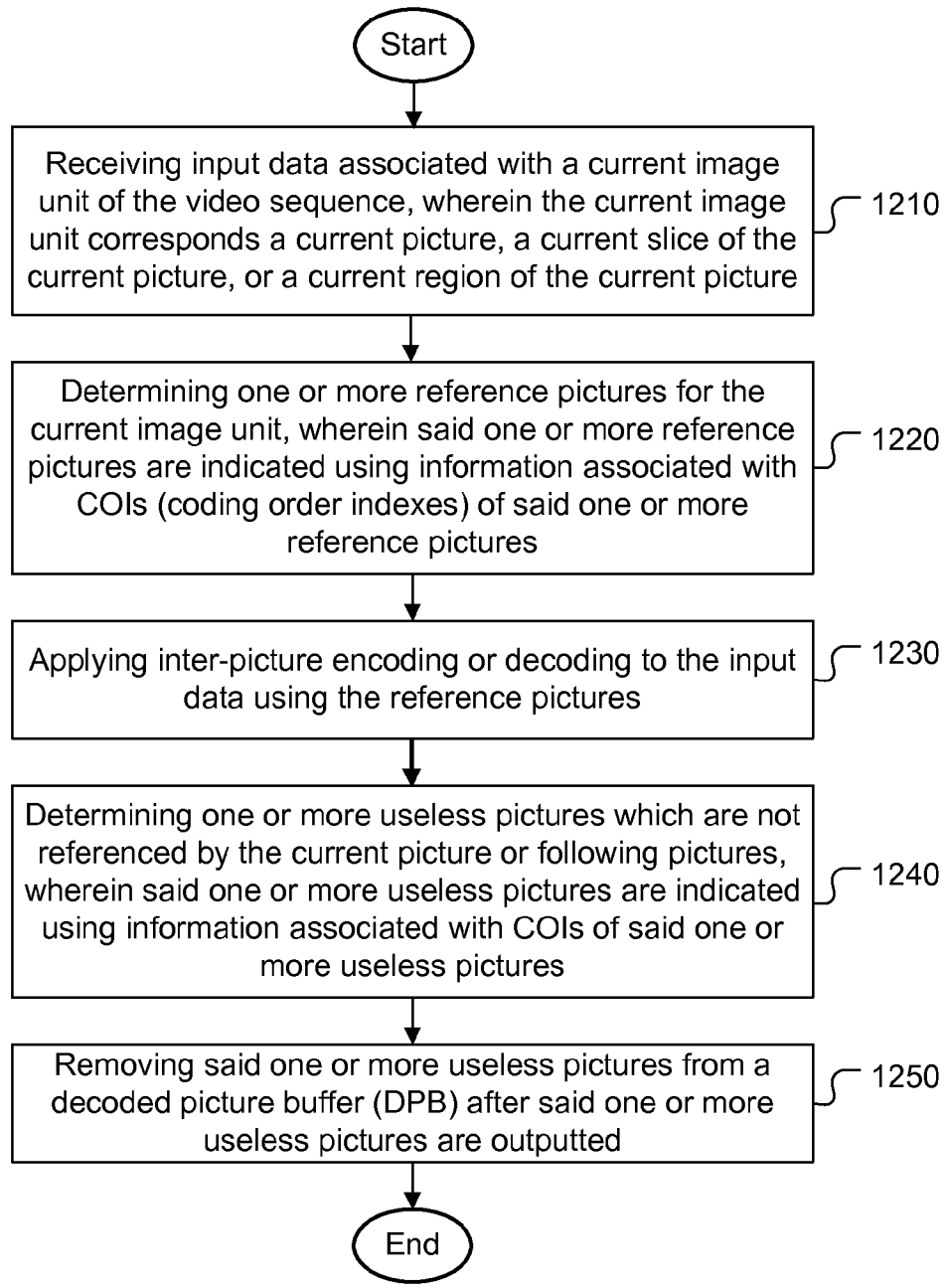
FIG. 12 illustrates an exemplary flowchart of reference picture management according to an embodiment of the present invention.

FIG. 12 illustrates an exemplary flowchart of reference picture management for video coding of a video sequence according to an embodiment of the present invention. The system receives input data associated with a current image unit of the video sequence as shown in step 1210, wherein the current image unit corresponds to a current picture, a current slice of the current picture, or a current region of the current picture. For encoding, the input data associated with the current picture corresponds to original pixel data to be coded. For decoding, the input data corresponds to the coded current picture to be decoded. The input data may be retrieved from storage such as a computer memory, buffer (RAM or DRAM) or other media. The input data may also be received from a processor such as a controller, a central processing unit, a digital signal processor or electronic circuits that produce the input data. One or more reference pictures for the current image unit are determined as shown in step 1220, wherein said one or more reference pictures are indicated using information associated with COIs (coding order indexes) of said one or more reference pictures. Inter-picture encoding or decoding is then applied to the input data using the reference pictures as shown in step 1230. One or more useless pictures which are not referenced by the current picture or following pictures are determined as shown in step 1240, wherein said one or more useless pictures are indicated using information associated with COIs of said one or more useless pictures. Said one or more useless pictures from a decoded picture buffer (DPB) are removed after said one or more useless pictures are outputted as shown in step 1250.

The flowcharts shown above are intended to illustrate examples of reference picture management method according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of reference picture management for video coding of a video sequence, the method comprising:
   receiving input data associated with a current image unit of the video sequence, wherein the current image unit corresponds to a current picture, a current slice of the current picture, or a current region of the current picture;
   determining one or more reference pictures for the current image unit, wherein said one or more reference pictures are indicated using information associated with COIs (coding order indexes) of said one or more reference pictures;
   applying inter-picture encoding or decoding to the input data using the reference pictures;
   determining one or more useless pictures which are not referenced by the current picture or following pictures, wherein said one or more useless pictures are indicated using information associated with COIs of said one or more useless pictures; and
   removing said one or more useless pictures from a decoded picture buffer (DPB) after said one or more useless pictures are outputted;
   wherein the COI (coding order index) is represented by a coded COI using a fixed number of bits, wherein the coded COI is constrained to a range from 0 to MAX COI-1 and MAX COI is one positive integer;
   wherein the COI is determined from the coded COI and COI MSB at a decoder side, wherein the COI MSB corresponds to a most significant bits portion of the COI exceeding the coded COI;
   wherein the COI MSB is initialized to 0 at the decoder side when a first picture or a refreshing picture in the video sequence is received at the decoder side.

2. The method of claim 1, wherein the information associated with the COIs is incorporated in a slice header or a picture header of a bitstream associated with the video sequence.

3. The method of claim 1, wherein the COI_MSB is incremented by N when a current coded COI received at the decoder side is lower than the coded COI of a last decoded picture, and N is one positive integer.

4. The method of claim 1, wherein a RCS (Reference Configuration Set) is used to define reference picture parameters associated with said one or more reference pictures.

5. The method of claim 4, wherein the reference picture parameters comprise a delta POI (playing order index) corresponding to a difference between the COI and POI of the current picture.

6. The method of claim 5, wherein POI of the current picture is recovered at a decoder side based on the COI and the delta POI.

7. The method of claim 5, wherein the reference picture parameters further comprise a first number of reference pictures, a second number of useless pictures, first indication regarding whether the current picture is referred by following pictures, second indication of decoded pictures that are referred by the current picture, third indication of the decoded pictures that belong to the useless pictures, or any combination thereof.

8. The method of claim 4, wherein the RCS is incorporated in a sequence header, a slice header or a picture header in a bitstream associated with the video sequence.

9. The method of claim 4, wherein multiple RCSs are used and a selection indicator is incorporated in a slice header or a picture header to select one RCS from the multiple RCSs for the current picture.

10. A method of reference picture management for video coding of a video sequence, the method comprising:
   receiving input data associated with a current image unit of the video sequence, wherein the current image unit corresponds to a current picture, a current slice of the current picture, or a current region of the current picture;
   determining one or more reference pictures for the current image unit, wherein said one or more reference pictures are indicated using information associated with COIs (coding order indexes) of said one or more reference pictures;

applying inter-picture encoding or decoding to the input data using the reference pictures;

determining one or more useless pictures which are not referenced by the current picture or following pictures, wherein said one or more useless pictures are indicated using information associated with COIs of said one or more useless pictures; and removing said one or more useless pictures from a decoded picture buffer (DPB) after said one or more useless pictures are outputted, wherein a RCS (Reference Configuration Set) is used to define reference picture parameters associated with said one or more reference pictures, wherein the reference picture parameters comprise a delta POI (playing order index) corresponding to a difference between the COI and POI of the current picture, wherein the reference picture parameters further comprise a first number of reference pictures, a second number of useless pictures, first indication regarding whether the current picture is referred by following pictures, second indication of decoded pictures that are referred by the current picture, third indication of the decoded pictures that belong to the useless pictures, or any combination thereof, and wherein a reference picture list of said one or more reference pictures for the current picture is reconstructed at a decoder side according to the reference picture parameters in the RCS.

11. The method of claim 10, wherein said one or more reference pictures of the current picture are put in said reference picture list in an ascending order or a descending according to an order indication in the RCS.

12. A method of reference picture management for video coding of a video sequence, the method comprising:

receiving input data associated with a current image unit of the video sequence, wherein the current image unit corresponds to a current picture, a current slice of the current picture, or a current region of the current picture;

determining one or more reference pictures for the current image unit, wherein said one or more reference pictures are indicated using information associated with COIs (coding order indexes) of said one or more reference pictures;

applying inter-picture encoding or decoding to the input data using the reference pictures;

determining one or more useless pictures which are not referenced by the current picture or following pictures, wherein said one or more useless pictures are indicated using information associated with COIs of said one or more useless pictures; and removing said one or more useless pictures from a decoded picture buffer (DPB) after said one or more useless pictures are outputted, wherein a RCS (Reference Configuration Set) is used to define reference picture parameters associated with said one or more reference pictures, wherein the reference picture parameters comprise a delta POI (playing order index) corresponding to a difference between the COI and POI of the current picture, wherein the reference picture parameters further comprise a first number of reference pictures, a second number of useless pictures, first indication regarding whether the current picture is referred by following pictures, second indication of decoded pictures that are referred by the current picture, third indication of the decoded pictures that belong to the useless pictures, or any combination thereof, and wherein said one or more reference pictures are identified by first differences between the COI of the current picture and the COIs of said one or more reference pictures.

13. The method of claim 12, wherein said one or more reference pictures are identified by said first difference minus N, and N is an integer.

14. A method of reference picture management for video coding of a video sequence, the method comprising:

receiving input data associated with a current image unit of the video sequence, wherein the current image unit corresponds to a current picture, a current slice of the current picture, or a current region of the current picture;

determining one or more reference pictures for the current image unit, wherein said one or more reference pictures are indicated using information associated with COIs (coding order indexes) of said one or more reference pictures;

applying inter-picture encoding or decoding to the input data using the reference pictures;

determining one or more useless pictures which are not referenced by the current picture or following pictures, wherein said one or more useless pictures are indicated using information associated with COIs of said one or more useless pictures; and removing said one or more useless pictures from a decoded picture buffer (DPB) after said one or more useless pictures are outputted, wherein a RCS (Reference Configuration Set) is used to define reference picture parameters associated with said one or more reference pictures, wherein the reference picture parameters comprise a delta POI (playing order index) corresponding to a difference between the COI and POI of the current picture, wherein the reference picture parameters further comprise a first number of reference pictures, a second number of useless pictures, first indication regarding whether the current picture is referred by following pictures, second indication of decoded pictures that are referred by the current picture, third indication of the decoded pictures that belong to the useless pictures, or any combination thereof, and wherein the useless pictures are identified by second differences between the COI of the current picture and the COIs of the useless pictures.

15. The method of claim 14, wherein the useless pictures are removed from the DPB at a decoder side after the useless pictures are outputted.

16. The method of claim 14, wherein the useless pictures are identified by said second difference minus N, and N is an integer.

17. A method of reference picture management for video coding of a video sequence, the method comprising:

receiving input data associated with a current image unit of the video sequence, wherein the current image unit corresponds to a current picture, a current slice of the current picture, or a current region of the current picture;

determining one or more reference pictures for the current image unit, wherein said one or more reference pictures are indicated using information associated with COIs (coding order indexes) of said one or more reference pictures;

applying inter-picture encoding or decoding to the input data using the reference pictures;

determining one or more useless pictures which are not referenced by the current picture or following pictures, wherein said one or more useless pictures are indicated using information associated with COIs of said one or more useless pictures; and removing said one or more useless pictures from a decoded picture buffer (DPB) after said one or more useless pictures are outputted, wherein a RCS (Reference Configuration Set) is used to define reference picture parameters associated with said one or more reference pictures, wherein the reference picture parameters comprise a delta POI (playing order index) corresponding to a difference between the COI and POI of the current picture, wherein the reference picture parameters further comprise a first number of reference pictures, a second number of useless pictures, first indication regarding whether the current picture is referred by following pictures, second indication of decoded pictures that are referred by the current picture, third indication of the decoded pictures that belong to the useless pictures, or any combination thereof, and wherein the current picture is removed from the DPB at a decoder side after the current picture is outputted if the current picture is not used by following pictures.

* * * * *